United States Patent
Hong

(10) Patent No.: US 11,134,413 B2
(45) Date of Patent: Sep. 28, 2021

(54) USER EQUIPMENT PROTECTION METHOD, DEVICE, USER EQUIPMENT AND BASE STATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 54 days.

(21) Appl. No.: 16/606,224

(22) PCT Filed: Apr. 20, 2017

(86) PCT No.: PCT/CN2017/081169
§ 371 (c)(1),
(2) Date: Oct. 18, 2019

(87) PCT Pub. No.: WO2018/191899
PCT Pub. Date: Oct. 25, 2018

(65) Prior Publication Data
US 2020/0145877 A1    May 7, 2020

(51) Int. Cl.
*H04L 12/28* (2006.01)
*H04W 28/06* (2009.01)
(Continued)

(52) U.S. Cl.
CPC .......... *H04W 28/06* (2013.01); *H04W 24/10* (2013.01); *H04W 28/0205* (2013.01); *H04W 88/023* (2013.01)

(58) Field of Classification Search
CPC . H04W 28/06; H04W 24/10; H04W 28/0205; H04W 88/023; H04W 52/00; H04W 88/02; H04W 24/02; H04W 24/04
(Continued)

(56) References Cited

U.S. PATENT DOCUMENTS

| 5,519,886 A | 5/1996 | Gilbert et al. |
| 2007/0173249 A1 | 7/2007 | Ogoshi |

(Continued)

FOREIGN PATENT DOCUMENTS

| CN | 1411638 A | 4/2003 |
| CN | 102119490 A | 7/2011 |

(Continued)

OTHER PUBLICATIONS

CN 1st Office Action in Application No. 201780000231.4, dated Feb. 5, 2021.
(Continued)

*Primary Examiner* — Mang Hang Yeung
(74) *Attorney, Agent, or Firm* — Syncoda LLC; Feng Ma

(57) ABSTRACT

A method for protecting a user equipment includes: after sending a first request message for adjusting radio link configuration to a base station, monitoring a response message corresponding to the first request message in a first preset time period; determining a sending time for sending a second request message for adjusting the radio link configuration based on a monitoring result in the first preset time period; and sending the second request message at the sending time. This can avoid frequently sending a request message for adjusting a radio link configuration to a base station, reducing spectrum resource utilization and signaling burden of the network.

18 Claims, 8 Drawing Sheets

(51) Int. Cl.
*H04W 24/10* (2009.01)
*H04W 28/02* (2009.01)
*H04W 88/02* (2009.01)

(58) Field of Classification Search
USPC .......................................................... 370/229
See application file for complete search history.

(56) References Cited

U.S. PATENT DOCUMENTS

| 2008/0025341 A1* | 1/2008 | Rao ..................... H04W 72/048 |
| | | 370/468 |
| 2013/0017851 A1* | 1/2013 | Kim .................... H04W 72/048 |
| | | 455/509 |
| 2013/0039287 A1* | 2/2013 | Rayavarapu ........ H04W 72/042 |
| | | 370/329 |

FOREIGN PATENT DOCUMENTS

| CN | 102548012 A | 7/2012 |
| CN | 105814513 A | 7/2016 |
| CN | 106155797 A | 11/2016 |
| CN | 106371985 A | 2/2017 |

OTHER PUBLICATIONS

Orange, Huawei:"pCR 32.856 Proposed text for clause 5.2 Analysis of control-monitoring information", (S5-166348), 3GPP TSG SA WG5 (Telecom Management), Meeting #110, Nov. 14-18, 2016, Reno, USA.

\* cited by examiner

USER EQUIPMENT PROTECTION METHOD, DEVICE, USER EQUIPMENT AND BASE STATION

CROSS-REFERENCE TO RELATED APPLICATION

The application is a national stage of International Application No. PCT/CN2017/081169 filed on Apr. 20, 2017, the disclosure of which is hereby incorporated by reference in its entirety.

TECHNICAL FIELD

The present disclosure relates to the field of wireless communication technologies, and in particular, to a method, a device, a user equipment, and a base station for protecting a user equipment.

BACKGROUND

In a long-term evolution (LTE) system, a wireless transmission mode such as a high-order multiple-input multiple-output (MIMO), a multi-carrier aggregation, or a high-order modulation and decoding can be set for a user equipment (UE) to meet user requirements for high-speed data transmission rates. However, such a high-speed wireless transmission mode may cause the UE overheating, and the UE overheating may further cause problems such as transmission interruption of service data of the UE or even restart of the equipment.

In the related art, in order to ensure a good experience when the user uses the UE, a UE provider generally performs temperature control on a mobile phone. For example, the UE can be controlled to reduce radio link configuration by means of being detached and reattached to avoid the UE being overheated. In the related art, the transmission interruption of service data may be caused when the UE is during the process of detaching and reattaching, thereby reducing the user experience.

SUMMARY

In order to overcome the problems in the related art, embodiments of the present disclosure provide a method, a device, a user equipment, and a base station for protecting a user equipment, so as to realize that the UE does not send request messages for reducing radio link configuration to the base station excessively frequently, thereby reducing signaling burden of a network.

According to a first aspect of the embodiments of the present disclosure, a method for protecting a user equipment is provided, including:

after sending a first request message for adjusting radio link configuration to a base station, monitoring a response message corresponding to the first request message during a first preset time period;

determining a sending time for sending a second request message for adjusting the radio link configuration based on a monitoring result during the first preset time period; and sending the second request message at the sending time.

In an embodiment, before monitoring a response message corresponding to the first request message during a first preset time period, the method further includes:

when it is judged that overheating of the user equipment is caused by the radio link configuration being too high, determining whether to send the first request message for adjusting the radio link configuration to the base station based on user preference; and when determining to send the first request message for adjusting the radio link configuration to the base station based on the user preference, sending the first request message for adjusting the radio link configuration to the base station.

In an embodiment, a setting manner of the first preset time period is static setting, or semi-static setting, or dynamic setting.

In an embodiment, the determining a sending time for sending a second request message for adjusting the radio link configuration based on a monitoring result during the first preset time period includes:

when the monitoring result is that the response message is not detected within the first preset time period, detecting an equipment temperature of the user equipment at the ending time of the first preset time period; and when the equipment temperature of the user equipment is higher than a preset temperature threshold at the ending time of the first preset time period, determining the ending time of the first preset time period as the sending time.

In an embodiment, the determining a sending time for sending a second request message for adjusting the radio link configuration based on a monitoring result during the first preset time period includes:

when the monitoring result is that the response message is monitored during the first preset time period, parsing the response message to obtain a base station indication time.

detecting the equipment temperature of the user equipment at the base station indication time; and when the equipment temperature of the user equipment at the base station indication time is higher than the preset temperature threshold, determining the base station indication time as the sending time.

In an embodiment, the determining a sending time for sending a second request message for adjusting the radio link configuration based on a monitoring result during the first preset time period includes:

when the monitoring result is that the response message is monitored within the first preset time period and the response message indicates to reduce the radio link configuration, detecting the equipment temperature of the user equipment within the second preset time period, wherein starting time of the second preset time period is the time the response message is received;

when the equipment temperature of the user equipment within the second preset time period indicates that the user equipment is still overheated, determining ending time of the second preset time period as the sending time; and when the equipment temperature of the user equipment within the second preset time period indicates that the user equipment is no longer overheated, determining time when the user equipment is overheated again as the sending time.

In an embodiment, the setting manner of the second preset time period is static setting or dynamic setting.

According to a second aspect of the embodiments of the present disclosure, a method for protecting a user equipment is provided, including:

receiving a request message for adjusting a radio link configuration sent by the user equipment;

generating and sending a first response message when it is determined there is no need to adjust the radio link configuration based on the request message, wherein a base station indication time is carried in the first response message, and the base station indication time is used to indicate the time when the base station instructs the user equipment to send the request message again.

In an embodiment, the method further includes:

generating and sending a second response message when it is determined that there is a need to adjust the radio link configuration based on the request message, wherein the radio link configuration information which the user equipment is to be adjusted to is carried in the second response message.

In an embodiment, a time length of the second preset time period is further carried in the second response message.

In an embodiment, the method further includes:

refusing to send a response message to the user equipment when it is determined that there is no need to adjust the radio link configuration based on the request message.

According to a third aspect of the embodiments of the present disclosure, a device for protecting a user equipment is provided, including:

a first monitoring module, configured to monitor a response message corresponding to the first request message during a first preset time period, after a first request message for adjusting radio link configuration is sent to a base station;

a time determining module, configured to determine a sending time for sending a second request message for adjusting the radio link configuration based on a monitoring result of the first monitoring module during the first preset time period; and a first sending module, configured to send the second request message at the sending time determined by the time determining module.

In an embodiment, the device further includes:

a user preference determining module, configured to determine whether to send the first request message for adjusting the radio link configuration to the base station based on user preference, when it is judged that overheating of the user equipment is caused by the radio link configuration being too high; and a second sending module, configured to send the first request message for adjusting the radio link configuration to the base station, when the user preference determining module determines that the first request message for adjusting the radio link configuration is sent to the base station based on the user preference.

In an embodiment, a setting manner of the first preset time period is static setting, or semi-static setting, or dynamic setting.

In an embodiment, the time determining module includes:

a first detecting sub-module, configured to detect an equipment temperature of the user equipment at the ending time of the first preset time period, when the monitoring result is that the response message is not detected within the first preset time period; and a first determining sub-module, configured to determine the ending time of the first preset time period as the sending time, when the first detecting sub-module determines that the equipment temperature of the user equipment is higher than a preset temperature threshold at the ending time of the first preset time period.

In an embodiment, the time determining module includes:

a first parsing sub-module, configured to parse the response message to obtain a base station indication time, when the monitoring result is that the response message is monitored during the first preset time period;

a second detection sub-module, configured to detect the equipment temperature of the user equipment at the base station indication time parsed and obtained by the first parsing sub-module; and a second determining sub-module, configured to determine the base station indication time as the sending time, when the second detecting sub-module determines that the equipment temperature of the user equipment at the base station indication time is higher than the preset temperature threshold.

In an embodiment, the time determining module includes:

a third detection sub-module, configured to detect the equipment temperature of the user equipment within the second preset time period, when the monitoring result is that the response message is monitored within the first preset time period and the response message indicates to reduce the radio link configuration, wherein starting time of the second preset time period is the time receiving the response message;

a third determining sub-module, configured to determine ending time of the second preset time period as the sending time when the third detecting sub-module determines that the equipment temperature of the user equipment within the second preset time period indicates that the user equipment is still overheated; and a fourth determining sub-module, configured to determine time when the user equipment is overheated again as the sending time when the third detecting sub-module determines that the equipment temperature of the user equipment within the second preset time period indicates that the user equipment is no longer overheated.

In an embodiment, the setting manner of the second preset time period is static setting or dynamic setting.

According to a fourth aspect of the embodiments of the present disclosure, a device for protecting a user equipment is provided, including:

a receiving module, configured to receive a request message for adjusting a radio link configuration sent by a user equipment; and a first generating module, configured to generate and send a first response message when it is determined there is no need to adjust the radio link configuration based on the request message, wherein a base station indication time is carried in the first response message, and the base station indication time is used to indicate the time when the base station indicates that the user equipment sends the request message again.

In an embodiment, the device further includes:

a second generating module, configured to generate and send a second response message when it is determined that there is a need to adjust the radio link configuration based on the request message received by the receiving module, wherein the radio link configuration information which the user equipment is to be adjusted to is carried in the second response message.

In an embodiment, a time length of the second preset time period is further carried in the second response message.

In an embodiment, the device further includes:

a refusing response module, configured to refuse to send a response message to the user equipment when it is determined that there is no need to adjust the radio link configuration based on the request message received by the receiving module.

According to a fifth aspect of the embodiments of the present disclosure, a user equipment is provided, including:

a processor;

a memory, for storing instructions executable by the processor;

wherein the processor is configured to:

monitor a response message corresponding to the first request message during a first preset time period after sending a first request message for adjusting radio link configuration to a base station;

determine a sending time for sending a second request message for adjusting the radio link configuration based on a monitoring result during the first preset time period; and send the second request message at the sending time.

According to a sixth aspect of the embodiments of the present disclosure, a base station is provided, including:

a processor;

a memory, for storing instructions executable by the processor;

wherein the processor is configured to:

receive a request message for adjusting a radio link configuration sent by the user equipment;

generate and send a first response message when it is determined there is no need to adjust the radio link configuration based on the request message, wherein a base station indication time is carried in the first response message, and the base station indication time is used to indicate the time when the base station instructs that the user equipment sends the request message again.

According to a seventh aspect of the embodiments of the present disclosure, a non-transitory computer readable storage medium is provided, computer instructions stored thereon, and when the instructions are executed by a processor, the following steps are implemented:

after sending a first request message for adjusting radio link configuration to a base station, monitoring a response message corresponding to the first request message during a first preset time period;

determining a sending time for sending a second request message for adjusting the radio link configuration based on a monitoring result during the first preset time period; and sending the second request message at the sending time.

According to an eighth aspect of the embodiments of the present disclosure, a non-transitory computer readable storage medium is provided, computer instructions stored thereon, and when the instructions are executed by a processor, the following steps are implemented:

receiving a request message for adjusting a radio link configuration sent by the user equipment;

generating and sending a first response message when it is determined there is no need to adjust the radio link configuration based on the request message, wherein a base station indication time is carried in the first response message, and the base station indication time is used to indicate the time when the base station instructs the user equipment to send the request message again.

The technical solution provided by the embodiment of the present disclosure may include the following beneficial effects:

When judging that overheating of the user equipment is caused by the radio link configuration being too high, the user equipment sends the first request message for adjusting the radio link configuration to the base station, and a timer for the first preset time period is set after the first request message is sent. The response message is monitored during the first preset time period, and the sending time for sending a second request message is determined based on the monitoring result, thereby avoiding frequently sending the request message to the base station at any time, and reducing the spectrum resource utilization and the signaling burden of the network.

The above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present disclosure. Instead, they are merely examples of devices and methods consistent with aspects of the present disclosure as detailed in the appended claims.

Figure 1A:
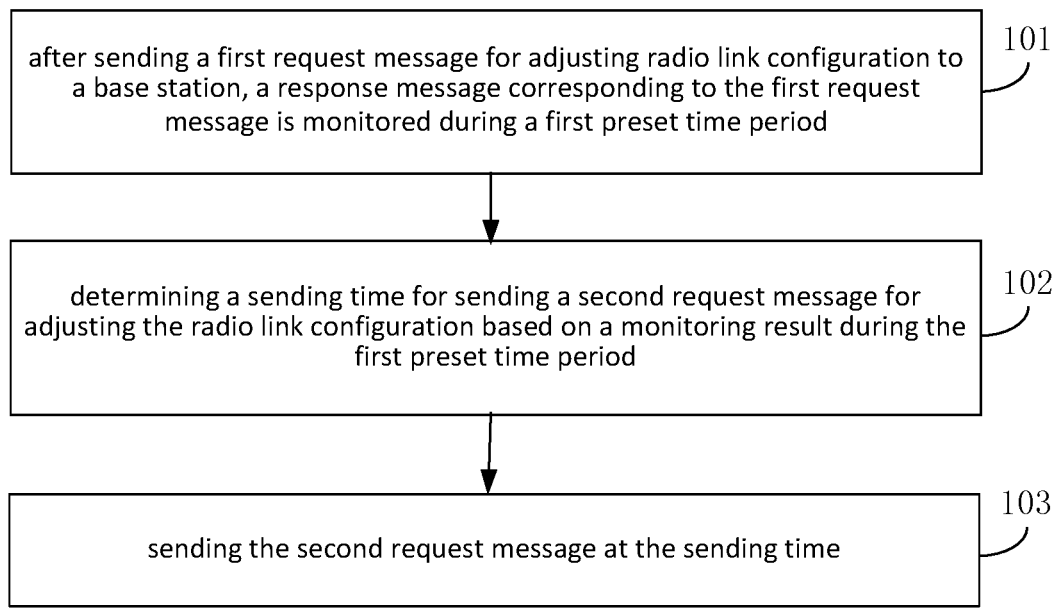
FIG. 1A is a flow chart showing a method for protecting a user equipment according to an exemplary embodiment.
Figure 1B:
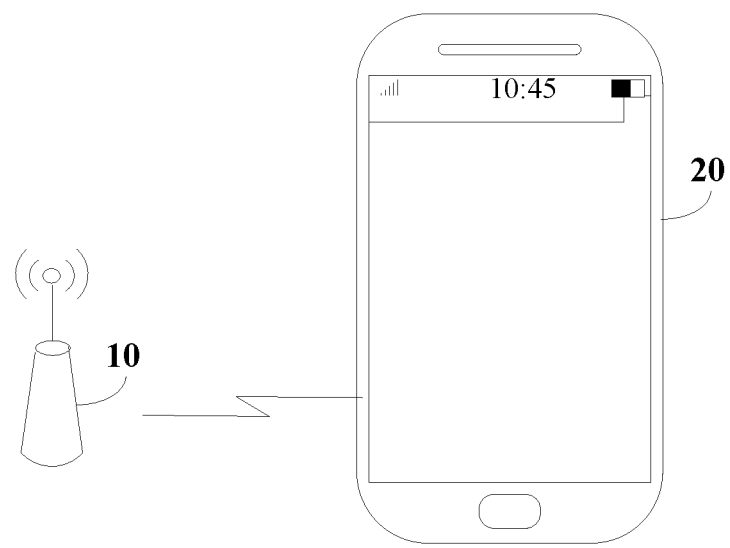
FIG. 1B is a scenario diagram showing a method for protecting a user equipment according to an exemplary embodiment.

FIG. 1A is a flow chart showing a method for protecting a user equipment according to an exemplary embodiment, and FIG. 1B is a scenario diagram showing a method for protecting a user equipment according to an exemplary embodiment; the method for protecting a user equipment can be applied to the user equipment. As shown in FIG. 1A, the method for protecting the user equipment includes the following steps 101-103.

In step 101, after sending a first request message for adjusting radio link configuration to a base station, a response message corresponding to the first request message is monitored in a first preset time period.

In an embodiment, a timer that is timed to be the first preset time period may be started when the first request message is sent, and if the timer expires, it may be determined that the time for sending the first request message exceeds the first preset time period. The starting time of the first preset time period is the time when the first request message is sent, that is, the time is started after the first request message is sent.

In an embodiment, the time length of the first preset time period may be set by the base station and indicated to the user equipment; in still another embodiment, the time length of the first preset time period may be set by the user equipment.

In an embodiment, when the overheating of the user equipment is caused by the radio link configuration being too high, the user equipment sends the first request message for adjusting the radio link configuration to the base station, and monitors whether a response message is received within the first preset time period after sending the first request message is sent. The current equipment temperature, the preset temperature threshold, and the radio link configuration to which the user equipment is to be adjusted and recommended by the user equipment, are carried in the first request message.

In an embodiment, whether the user equipment is overheated may be judged based on whether the temperature of the user equipment exceeds a preset temperature threshold and continues for more than a certain time. For example, it can be judged that the user equipment is overheated when the temperature of the user equipment exceeds 85 degrees for 5 minutes. In an embodiment, the temperature of the user equipment may be a battery surface temperature of the user equipment, or a central processing unit (CPU) surface temperature, or a temperature of a front screen or a rear case of the user equipment.

In step 102, sending time for sending a second request message for adjusting the radio link configuration is determined based on a monitoring result in the first preset time period.

Figure 2A:
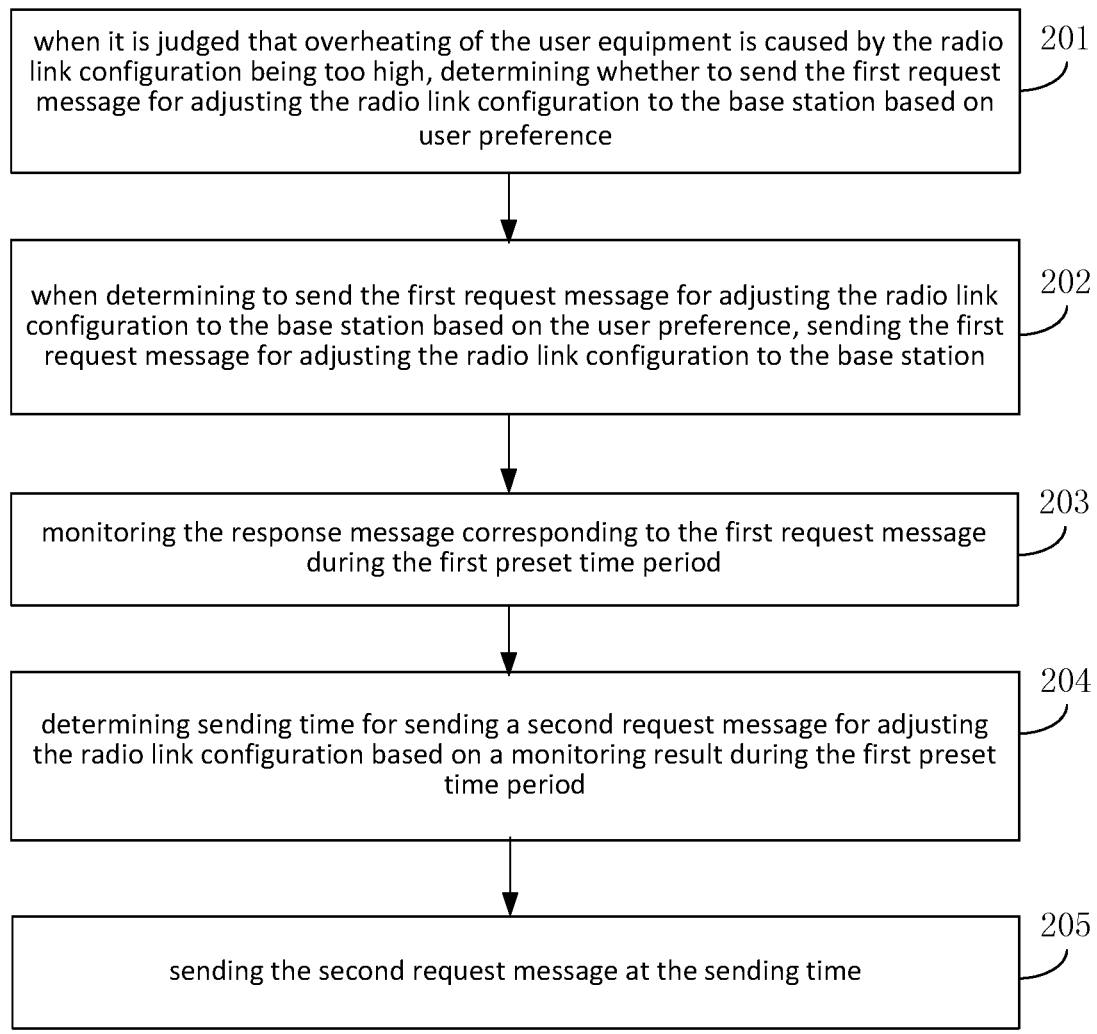
FIG. 2A is a flowchart showing still another method for protecting a user equipment, according to an exemplary embodiment.
Figure 2B:
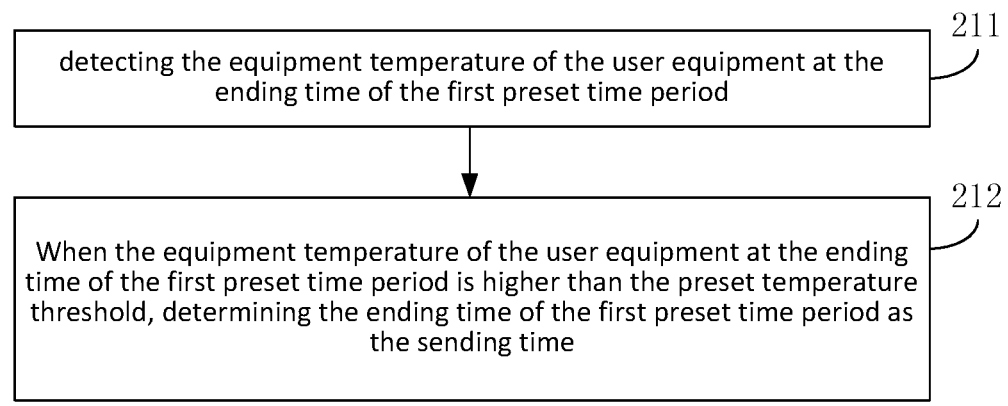
FIG. 2B is a first flowchart of a method for determining a sending time based on a monitoring result in the embodiment shown in FIG. 2A.
Figure 2C:
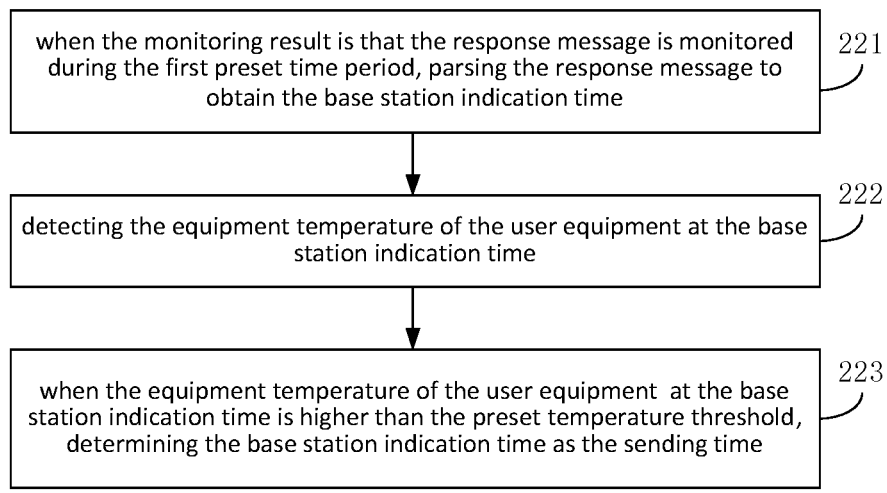
FIG. 2C is a second flowchart of a method for determining a sending time based on a monitoring result in the embodiment shown in FIG. 2A.
Figure 2D:
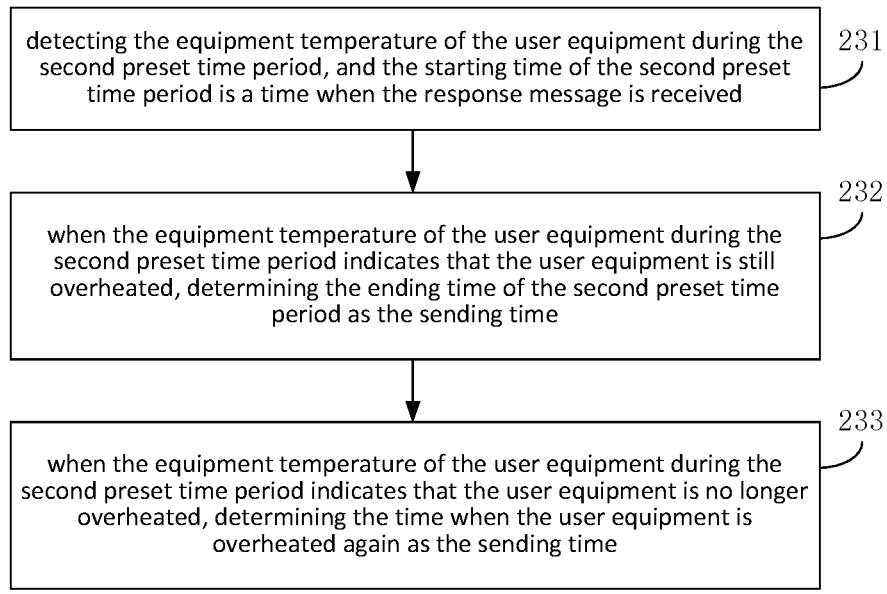
FIG. 2D is a third flowchart of a method for determining a sending time based on a monitoring result in the embodiment shown in FIG. 2A.

In an embodiment, the method for determining the sending time for sending a second request message for adjusting the radio link configuration is determined based on a monitoring result in the first preset time period may be referred to the embodiment shown in FIG. 2B to FIG. 2D, and details are not described herein.

In an embodiment, the second request message may be consistent with the first request message, for example, when the equipment temperature does not change within the first preset time period, the second request message and the first request message may be consistent, that is, the content carried is the same; in an embodiment, the second request message may be consistent with the first request message, for example, when the equipment temperature changes during the first preset time period, the second request message and the first request message may be not consistent, that is, the content carried is different.

In step 103, the second request message is sent at the sending time.

In an exemplary scenario, as shown in FIG. 1B, in the scenario shown in FIG. 1B, a base station 10, a user equipment (such as a smart phone, a tablet, etc.) 20 is included, wherein the user equipment 20 can monitor a response message corresponding to the first request message in a first preset time period after sending a first request message for adjusting radio link configuration to a base station, determines the sending time for sending a second request message for adjusting the radio link configuration based on a monitoring result during the first preset time period, and sends the second request message at the determined sending time, instead of frequently sending the request message to the base station at any time after the first request message is sent, thereby the spectrum resource utilization and the signaling burden of the network is reduced.

By the foregoing step 101 to step 103, it can realize to set a timer for the first preset time period after the user equipment is overheated and the first request message is sent to the base station, monitor a response message during a first preset time period and determine the sending time for sending a second request message based on the monitoring result, thereby avoiding frequently sending the request message to the base station at any time, and reducing the spectrum resource utilization and the signaling burden of the network.

In an embodiment, before monitoring a response message corresponding to the first request message during a first preset time period, the method for protecting the user equipment may further includes:

when it is judged that overheating of the user equipment is caused by the radio link configuration being too high, determining whether to send the first request message for adjusting the radio link configuration to the base station based on user preference; and when determining to send the first request message for adjusting the radio link configuration to the base station based on the user preference, sending the first request message for adjusting the radio link configuration to the base station.

In an embodiment, a setting manner for the first preset time period is static setting, or semi-static setting, or dynamic setting.

In an embodiment, the determining a sending time for sending a second request message for adjusting the radio link configuration based on a monitoring result in the first preset time period includes:

when the monitoring result is that the response message is not detected during the first preset time period, detecting an equipment temperature of the user equipment at the ending time of the first preset time period; and when the equipment temperature of the user equipment is higher than a preset temperature threshold at the ending time of the first preset time period, determining the ending time of the first preset time period as the sending time.

In an embodiment, the determining a sending time for sending a second request message for adjusting the radio link configuration based on a monitoring result in the first preset time period includes:

when the monitoring result is that the response message is monitored during the first preset time period, parsing the response message to obtain a base station indication time;

detecting the equipment temperature of the user equipment at the base station indication time; and when the equipment temperature of the user equipment at the base station indication time is higher than the preset temperature threshold, determining the base station indication time as the sending time.

In an embodiment, the determining a sending time for sending a second request message for adjusting the radio link configuration based on a monitoring result in the first preset time period includes:

when the monitoring result is that the response message is monitored during the first preset time period and the radio link configuration indicates to reduce the response message, detecting the equipment temperature of the user equipment during the second preset time period, wherein starting time of the second preset time period is the time receiving the response message;

when the equipment temperature of the user equipment during the second preset time period indicates that the user equipment is still overheated, determining ending time of the second preset time period as the sending time; and when the equipment temperature of the user equipment during the second preset time period indicates that the user equipment is no longer overheated, determining time when the user equipment is overheated again as the sending time.

In an embodiment, the setting manner of the second preset time period is static setting or dynamic setting.

For details on how to protect user equipment, please refer to the following embodiments.

The technical solutions provided by the embodiments of the present disclosure are described in the following specific embodiments.

Figure 2E:
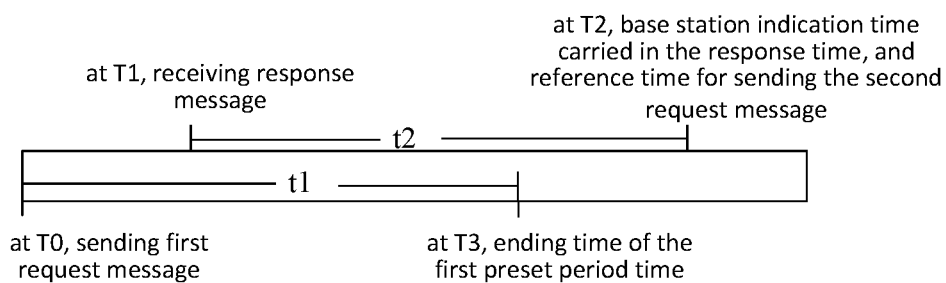
FIG. 2E is a first schematic diagram of the sending time determined in the embodiment shown in FIG. 2A.
Figure 2F:
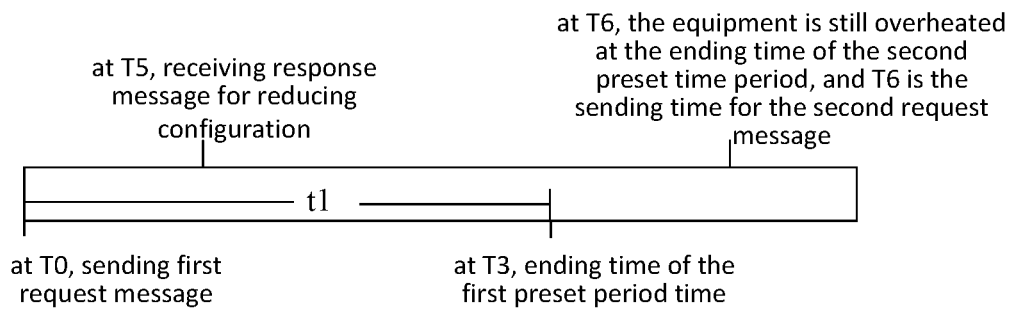
FIG. 2F is a second schematic diagram of the sending time determined in the embodiment shown in FIG. 2A.

FIG. 2A is a flowchart showing still another method for protecting a user equipment, according to an exemplary embodiment; FIG. 2B is a first flowchart of a method for determining a sending time based on a monitoring result in the embodiment shown in FIG. 2A; FIG. 2C is a second flowchart of a method for determining a sending time based on a monitoring result in the embodiment shown in FIG. 2A; FIG. 2D is a third flowchart of a method for determining a sending time based on a monitoring result in the embodiment shown in FIG. 2A; FIG. 2E is a first schematic diagram of the sending time determined in the embodiment shown in FIG. 2A; FIG. 2F is a second schematic diagram of the sending time determined in the embodiment shown in FIG. 2A. This embodiment uses the foregoing method provided by the embodiment of the present disclosure to exemplify how to send a request message for adjusting a radio link configuration to a base station. As shown in FIG. 2A, the following steps are included:

In step 201, when it is judged that overheating of the user equipment is caused by the radio link configuration being too high, determining whether to send the first request message for adjusting the radio link configuration to the base station based on user preference is determined.

In an embodiment, the determining whether to send the first request message to the base station based on the user preference may be embodied in the following two implementation manners.

The first implementation manner is as follows: the determining whether to send the first request message for adjusting the radio link configuration to the base station based on user preference, including: generating prompt information, wherein the prompt information is used to prompt the user whether to reduce the radio link configuration; receiving feedback information input by the user based on the prompt information; and determining whether to send the request message for adjusting the radio link configuration to the base station based on the feedback information.

The second implementation manner is as follows: the determining whether to send the first request message for adjusting the radio link configuration to the base station based on user preference, including: acquiring a preset setting item, wherein the preset setting item is used to indicates whether the request message is sent to the base station when the user equipment is overheated; and determining whether to send a request message for adjusting the radio link configuration to the base station based on the value of the preset setting item, wherein the value of the preset setting item is preset by the user.

In an embodiment, the preset setting item may be a system setting item or an application management setting item, and a general user may set and store the preset setting item in the setting interface of the user equipment.

In step 202, when it is determined that the first request message for adjusting the radio link configuration is sent to the base station based on the user preference, the first request message for adjusting the radio link configuration is sent to the base station.

In step 203, the response message corresponding to the first request message is monitored in the first preset time period.

In an embodiment, the description of step 203 can be referred to the description of step 101 of the embodiment shown in FIG. 1A, and will not be described in detail herein.

In step 204, sending time for sending a second request message for adjusting the radio link configuration is determined based on a monitoring result in the first preset time period.

In an embodiment, the monitoring result may be that the response message is not detected within the first preset time period, the sending time may be determined according to the embodiment shown in FIG. 2B. As shown in FIG. 2B, the following steps are included:

In step 211, the equipment temperature of the user equipment at the ending time of the first preset time period is detected.

In step 212, when the equipment temperature of the user equipment at the ending time of the first preset time period is higher than the preset temperature threshold, the ending time of the first preset time period is determined as the sending time.

In an embodiment, since the user equipment has been in an overheated state for a long time, and in the case that no response message for reducing the radio link configuration is detected during the first preset time period, it is determined whether the user equipment is still overheated only based on whether the equipment temperature at the ending time of the first preset time period is higher than a preset temperature threshold, and the ending time of the first preset time period is determined as the sending time for sending the second request message when it is determined that the user equipment is overheated. For example, the time length of the first preset time period is 5 minutes, and the timing is started after the first request message is sent at 11:35. If the response message is not received at 11:40, the second request message is sent at 11:40. In an embodiment, the second request message may be consistent with the first request message, for example, when the equipment temperature does not change during the first preset time period, the second request message and the first request message may be consistent, that is, the content carried is the same; in an embodiment, the second request message may be consistent with the first request message, for example, when the equipment temperature changes during the first preset time period, the second request message and the first request message may be not consistent, that is, the content carried is different.

In an embodiment, when the monitoring result is that the response message is monitored during the first preset time period and the base station indication time is carried in the response message, the sending time may be determined according to the embodiment shown in FIG. 2C. As shown in FIG. 2C, the following steps are included:

In step 221, when the monitoring result is that the response message is monitored during the first preset time period, the response message is parsed to obtain the base station indication time.

In an embodiment, the base station indication time may be a time point. For example, the base station indication time is the time after t1 when receiving the response message, or the time T3 is directly designated as the base station indication time.

In step 222, the equipment temperature of the user equipment at the base station indication time is detected.

In an embodiment, the priority of the base station indication time is higher than the priority of the ending time of the first preset time period. Referring to FIG. 2E, when the UE sends the first request message at time T0, whether to receive a response message during the first preset time period t1 is monitored. If the response message is monitored at the time T1 (T1 is within the first preset time period), and the response message carries the base station indication time T2 (after t2 period from the time the response message is received) as the sending reference time for sending a second request message, while the ending time (time T3) of the first preset time period is not used as the reference time for sending the second request message.

In an embodiment, it can determine whether the base station indication time is the sending time for sending a second request message by further detecting whether the equipment temperature of the user equipment at the base station indication time is higher than the preset temperature threshold.

In step 223, when the equipment temperature of the user equipment at the base station indication time is higher than the preset temperature threshold, the base station indication time is determined as the sending time.

In an embodiment, when the monitoring result is that the response message is monitored during the first preset time period and the response message indicates to reduce the radio link configuration, the sending time is determined according to the embodiment shown in FIG. 2D. As shown in FIG. 2D, the following step is included:

In step 231, the equipment temperature of the user equipment in the second preset time period is detected, and the starting time of the second preset time period is the time receiving the response message.

In an embodiment, the second preset time period can be understood as a time period for solving the overheating of the device, that is, the second preset time period is the maximum time length allowing the equipment temperature of the user equipment higher than the preset temperature threshold, after the base station adjusts the radio link configuration of the user equipment based on the first request message. If the equipment temperature is higher than the preset temperature threshold during the second preset time period from when the radio link configuration is reduced, the request message for adjusting the radio link configuration is not allowed to be sent to the base station; if the equipment temperature is still higher than the preset temperature threshold after the second preset time period from when the radio link configuration is reduced, the second request message for adjusting the radio link configuration is sent to the base station again at the ending time of the second preset time period.

In an embodiment, the time length of the second preset time period may be set by the base station and indicated to the user equipment; in still another embodiment, the time length of the second preset time period may be set by the user equipment.

In an embodiment, the time length of the second preset time period may be statically set. For example, the length of the second preset time period is set to 10 minutes, regardless of what the equipment temperature of the user equipment is, and what the preset temperature threshold used to limit the overheating of the user equipment is.

In an embodiment, the length of the second preset time period may also be dynamically set. For example, if the current equipment temperature of the user equipment is 90 degrees and the preset temperature threshold is 85 degrees, the length of the second preset time period may be set to 10 minutes; if the current equipment temperature of the user equipment is 90 degrees and the preset temperature threshold is 80 degrees, the time length of the second preset time period may be set to 20 minutes; if the current equipment temperature of the user equipment is 92 degrees, and the preset temperature threshold is 80 degrees, the time length of the second preset time period may be set to 25 minutes.

In step 232, when the equipment temperature of the user equipment during the second preset time period indicates that the user equipment is still overheated, the ending time of the second preset time period is determined as the sending time.

In an embodiment, in step 231 and step 232, referring to FIG. 2F, the UE sends the first request message at time T0, and receives the response message for reducing configuration at time T5; whether the user equipment is still overheated can be determined by detecting the equipment temperature during the second preset time period (that is, the time period between T5 and T6). If the temperature of the user equipment continues to decrease, but the speed of the decrease is small, and the equipment temperature of the user equipment is still far greater than the preset temperature threshold at the end of the second preset time period, it may be determined that the user equipment is still overheated; if the temperature of the user equipment dose not decrease, it can also be determined that the user equipment is still overheated.

In step 233, when the equipment temperature of the user equipment in the second preset time period indicates that the user equipment is no longer overheated, the time when the user equipment is overheated again is determined as the sending time.

In an embodiment, if the temperature of the user equipment continues to decrease during the second preset time period, and the equipment temperature of the user equipment has decreased below the preset temperature threshold at the end of the second preset time period, it can be determined that the user equipment is no longer overheated. For example, the preset temperature threshold is 85 degrees, and if the equipment temperature decreases from 90 degrees to 84 degrees during the second preset time period after adjusting the wireless link identifier, it can be determined that the user equipment is no longer overheated. In still another embodiment, if the equipment temperature of the user equipment continues to decrease during the second preset time period, and the equipment temperature of the user equipment has decreased to the adjacent preset temperature threshold at the end of the second preset time period, it still can be determined that the user equipment is no longer overheated. For example, the preset temperature threshold is 85 degrees, and if the equipment temperature decreases from 90 degrees to 86 degrees during the second preset time period after adjusting the wireless link identifier, and the change curve of the equipment temperature continuously decreases, it can be inferred that the equipment temperature of the user equipment can further decrease to less than 85 degrees after a short time period, so it can also be determined that the user equipment is no longer overheated.

In an embodiment, the time when the user equipment is overheated again can be understood as the time when the user equipment is overheated again due to the problem of the radio link configuration after a relatively long time.

In step 205, the second request message is sent at the sending time.

In the embodiment, by the foregoing step 201 to step 205, it can be realized that a timer for the first preset time period is set, after the user equipment is overheated and the first request message is sent to the base station, a response message in a first preset time period is monitored, and the sending time for sending a second request message is determined based on the monitoring result, thereby avoiding frequently sending the request message to the base station at any time, and reducing the spectrum resource utilization and the signaling burden of the network.

Figure 3:
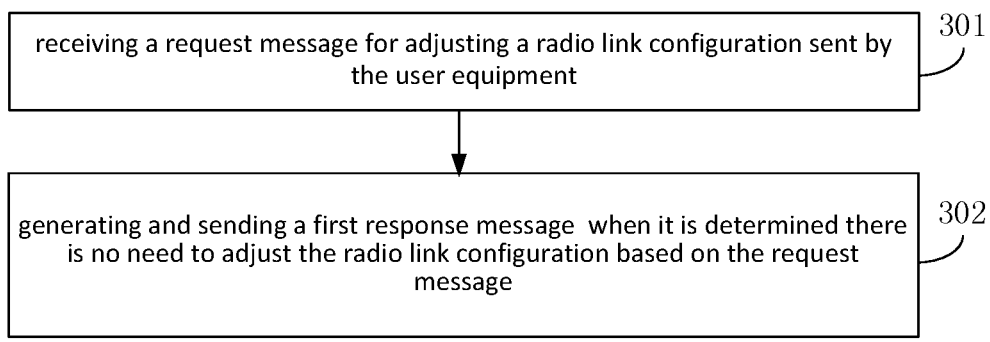
FIG. 3 is a flowchart showing a method for protecting a user equipment according to an exemplary embodiment.

FIG. 3 is a flowchart showing a method for protecting a user equipment according to an exemplary embodiment; the method for protecting a user equipment may be applied to a base station. As shown in FIG. 3, the method for protecting a user equipment includes the following steps 301-303:

In step 301, a request message for adjusting a radio link configuration sent by the user equipment is received.

In an embodiment, a current temperature of the user equipment and a preset temperature threshold may be carried in the request message.

In step 302, a first response message is generated and sent when it is determined there is no need to adjust the radio link configuration based on the request message.

In an embodiment, the base station indication time and the base station indication time used to indicate the time when the user equipment sends the request message again, may be carried in the request message.

In an embodiment, the base station may determine whether there is a need to adjust the radio link configuration based on the current temperature of the user equipment, the preset temperature threshold, and the data information of the service data to be transmitted. For example, the current temperature of the user equipment is 75 degrees, and the preset temperature threshold is 72 degrees, it can be determined that the current temperature of the user equipment is not particularly high, and the data volume of the current service data to be transmitted is relatively large, and the service quality of the service data is also high, then it can be determined that there is no need to temporarily adjust the radio link configuration. In still another embodiment, the base station may also determine whether there is no need to temporarily adjust the radio link configuration based on other information.

In an embodiment, the base station indication time may be carried in the first response message, and is used to indicate when the user equipment sends the request message for adjusting the radio link configuration again.

In an exemplary scenario as shown in FIG. 1B, in the scenario shown in FIG. 1B, a base station 10, a user equipment (such as a smart phone, a tablet, etc.) 20 is included, wherein the base station 10 may send the first response message to the user equipment 20 when receiving the request message for adjusting the radio link configuration sent by the user equipment 20 and disagreeing to reduce the radio link configuration, and indicates the user equipment 20 to send the request message at the base station indication time again with the base station indication time in the first response message, thereby avoiding the user equipment frequently sending the request message to the base station and reducing the spectrum resource utilization and the signaling burden of the network.

In the embodiment, by the foregoing step 301 to step 302, it can be realized to send the first response message to the user equipment when the base station disagrees to reduce the radio link configuration, and then indicate the user equipment to send the request message at the base station indication time again with the base station indication time in the first response message, thereby avoiding the user equipment frequently sending the request message to the base station and reducing the spectrum resource utilization and the signaling burden of the network.

In an embodiment, the method for protecting the device may further include:

generating and sending a second response message when determining that there is a need to adjust the radio link configuration based on the request message, wherein the radio link configuration information which the user equipment is to be adjusted to is carried in the second response message.

In an embodiment, a time length of the second preset time period is further carried in the second response message.

In an embodiment, the method for protecting the device may further include:

refusing to send a response message to the user equipment when it is determined that there is no need to adjust the radio link configuration based on the request message.

For details on how to protect user equipment, please refer to the following embodiments.

The technical solutions provided by the embodiments of the present disclosure are described in the following specific embodiments.

Figure 4:
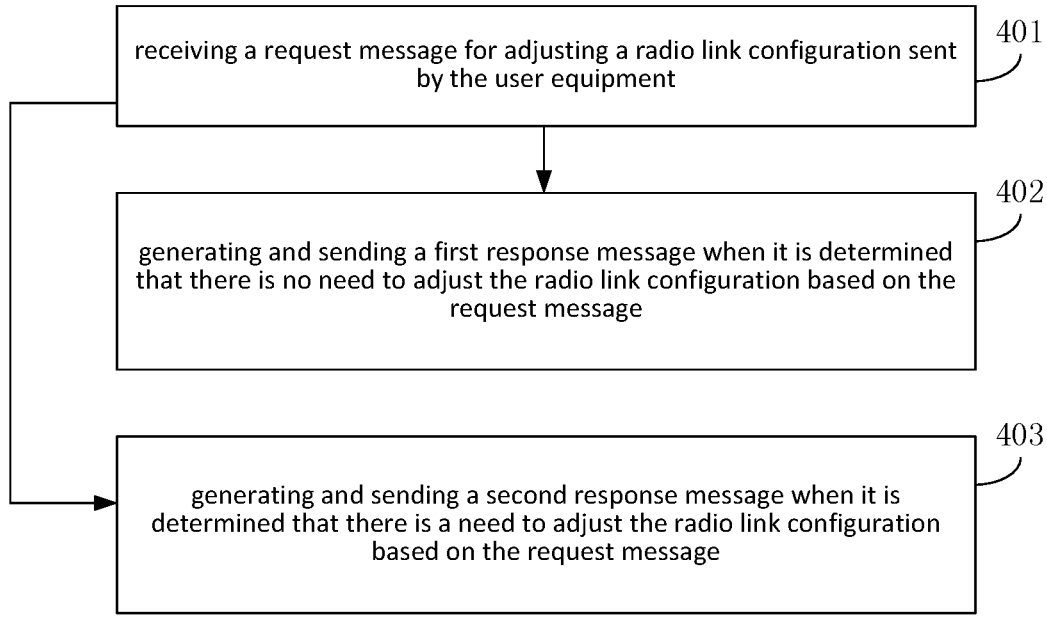
FIG. 4 is a flowchart showing still another method for protecting a user equipment according to an exemplary embodiment.

FIG. 4 is a flowchart showing still another method for protecting a user equipment according to an exemplary embodiment. This embodiment uses the foregoing method provided by the embodiment of the present disclosure to exemplify how to avoid the user equipment frequently sending the request message for reducing the radio link configuration. As shown in FIG. 4, the following steps are included:

In step 401, a request message for adjusting a radio link configuration sent by the user equipment is received.

In step 402, a first response message is generated and sent when it is determined there is no need to adjust the radio link configuration based on the request message.

In an embodiment, the base station indication time is carried in the first response message, and the base station indication time is used to indicate the time when the user equipment sends the request message again.

In an embodiment, the base station indication time may be a time point. For example, the base station indication time is the time after t1 from when the response message is received, or the time T3 is directly designated as the base station indication time.

In step 403, a second response message is generated and sent when it is determined that there is a need to adjust the radio link configuration based on the request message.

In an embodiment, the radio link configuration information which the user equipment is to be adjusted to is carried in the second response message.

In an embodiment, the second response message may further carry the time length of the second preset time period.

In an embodiment, the time length of the second preset time period may be statically set. For example, the length of the second preset time period is set to 10 minutes, regardless of what the equipment temperature of the user equipment is, and what the preset temperature threshold used to limit the overheating of the user equipment is.

In an embodiment, the length of the second preset time period may also be dynamically set. For example, if the current equipment temperature of the user equipment is 90 degrees and the preset temperature threshold is 85 degrees, the length of the second preset time period may be set to 10 minutes; if the current equipment temperature of the user equipment is 90 degrees and the preset temperature threshold is 80 degrees, the time length of the second preset time period may be set to 20 minutes; if the current equipment temperature of the user equipment is 92 degrees, and the preset temperature threshold is 80 degrees, the time length of the second preset time period may be set to 25 minutes.

In the embodiment, by the foregoing steps 401 to 403, it can realize that the second response message is sent to the user equipment, when the base station agrees to reduce the radio link configuration, so that the user equipment determines whether to send the second request message at the ending time of the second preset time period according to the change condition of the equipment temperature during the second preset time period from the time when the second response message is received, thereby avoiding the user equipment frequently sending the request message to the base station in the second preset time period and reducing the spectrum resource utilization and the signaling burden of the network.

Figure 5:
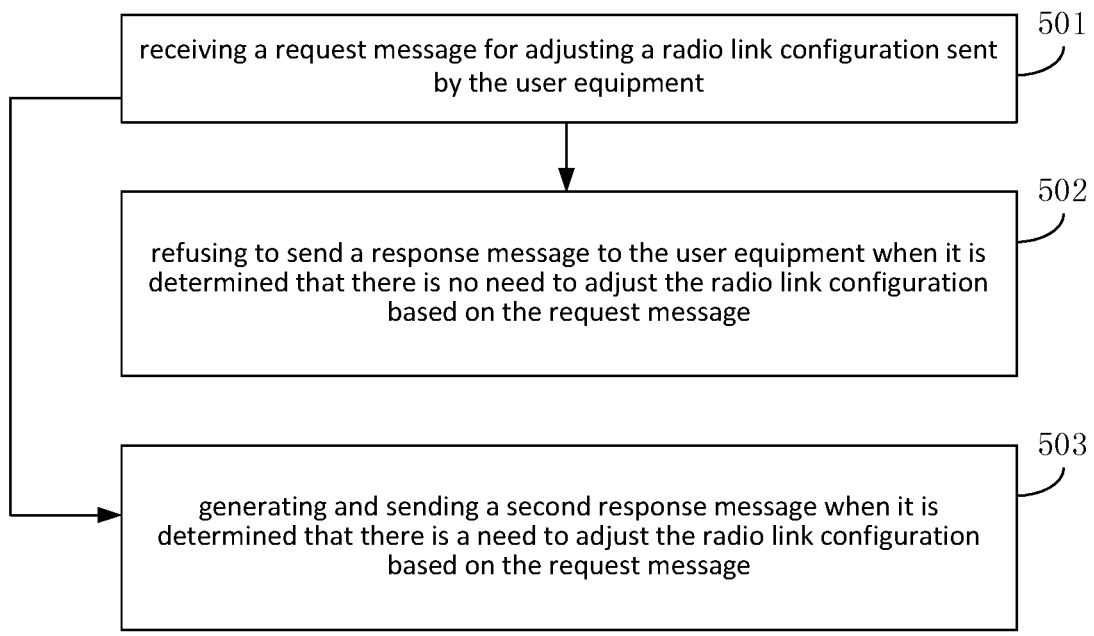
FIG. 5 is a flowchart showing still another method for protecting a user equipment according to an exemplary embodiment.

FIG. 5 is a flowchart showing still another method for protecting a user equipment according to an exemplary embodiment. This embodiment uses the foregoing method provided by the embodiment of the present disclosure to exemplify how to avoid the user equipment frequently sending the request message for reducing the radio link configuration. As shown in FIG. 5, the following steps are included:

In step 501, a request message for adjusting a radio link configuration sent by the user equipment is received.

In step 502, a response message is refused to send to the user equipment when it is determined that there is no need to adjust the radio link configuration based on the request message.

In step 503, a second response message is generated and sent when it is determined that there is a need to adjust the radio link configuration based on the request message.

In an embodiment, the radio link configuration information which the user equipment is to be adjusted to is carried in the second response message.

In the embodiment, by the foregoing steps 501 to 503, it can realize that the base station refuses to send the response message to the user equipment when disagreeing to reduce the radio link configuration. For example, if the base station considers that the overheating of the user equipment caused by the current radio link configuration does not affect the further use of the user equipment, the base station can refuse to send the response message, further reducing the signaling interaction.

Figure 6:
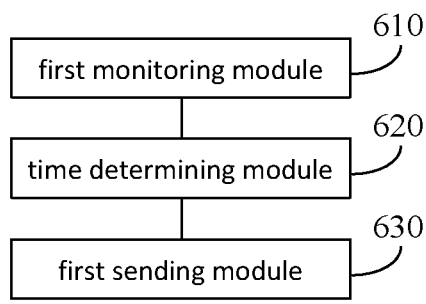
FIG. 6 is a block diagram showing a device for protecting a user equipment according to an exemplary embodiment.

FIG. 6 is a block diagram showing a device for protecting a user equipment according to an exemplary embodiment, wherein the device is applied to a user equipment. As shown in FIG. 6, the device for protecting a user equipment includes:

a first monitoring module 610, configured to monitor a response message corresponding to the first request message during a first preset time period, after a first request message for adjusting radio link configuration is sent to a base station;

a time determining module 620, configured to determine a sending time for sending a second request message for adjusting the radio link configuration based on a monitoring result of the first listening module 610 during the first preset time period; and a first sending module 630, configured to send the second request message at the sending time determined by the time determining module 620.

Figure 7:
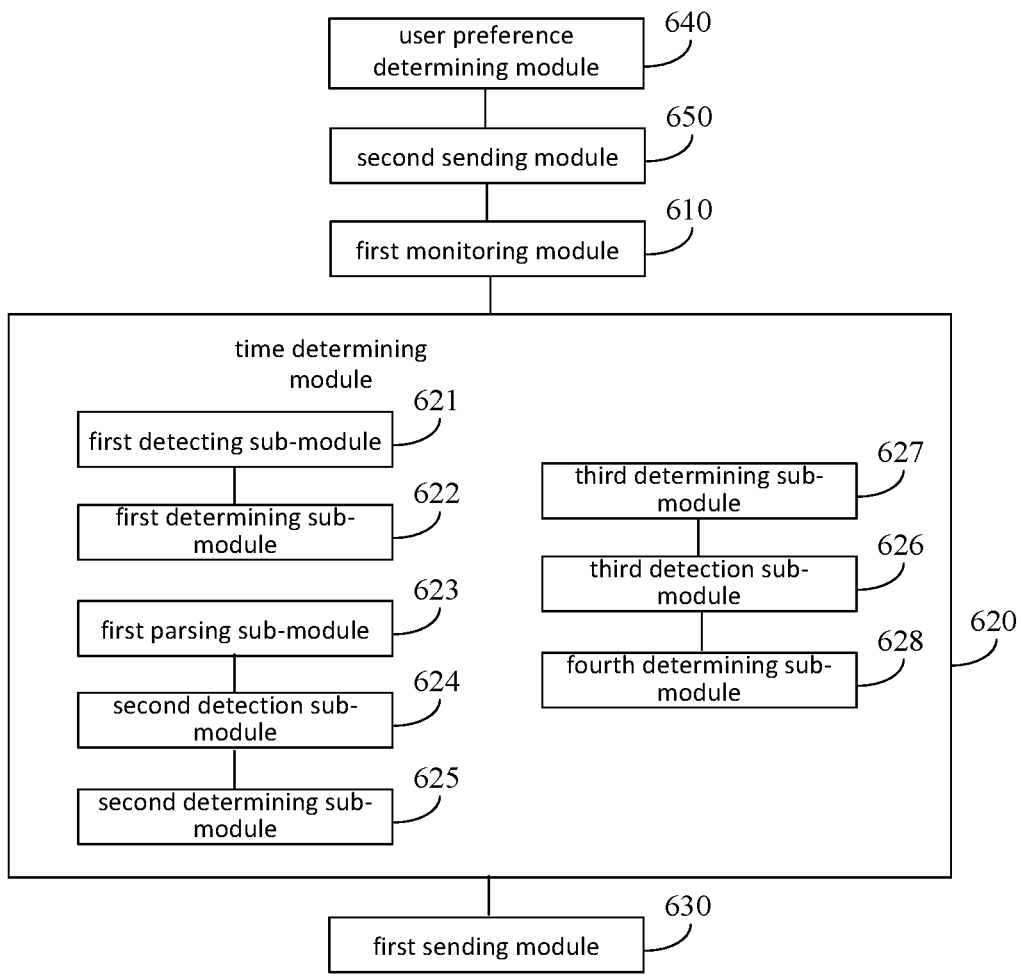
FIG. 7 is a block diagram of another device for protecting a user equipment according to an exemplary embodiment.

FIG. 7 is a block diagram showing another device for protecting a user equipment according to an exemplary embodiment. As shown in FIG. 7, on the basis of the foregoing embodiment shown in FIG. 6, in an embodiment, the device also includes:

a user preference determining module 640, configured to determine whether to send the first request message for adjusting the radio link configuration to the base station based on user preference, when it is judged that overheating of the user equipment is caused by the radio link configuration being too high; and a second sending module 650, configured to send the first request message for adjusting the radio link configuration to the base station, when the user preference determining module 640 determines that the first request message for adjusting the radio link configuration is sent to the base station based on the user preference.

In an embodiment, the setting manner of the first preset time period is static setting, or semi-static setting, or dynamic setting.

In an embodiment, the time determining module 620 includes:

a first detecting sub-module 621, configured to detect an equipment temperature of the user equipment at the ending time of the first preset time period, when the monitoring result is that the response message is not detected within the first preset time period; and a first determining sub-module 622, configured to determine the ending time of the first preset time period as the sending time, when the first detecting sub-module 621 determines that the equipment temperature of the user equipment is higher than a preset temperature threshold at the ending time of the first preset time period.

In an embodiment, the time determining module 620 includes:

a first parsing sub-module 623, configured to parse the response message to obtain base station indication time, when the monitoring result is that the response message is monitored in the first preset time period;

a second detection sub-module 624, configured to detect the equipment temperature of the user equipment at the base station indication time parsed and obtained by the first parsing sub-module; and a second determining sub-module 625, configured to determine the base station indication time as the sending time, when the second detecting sub-module 624 determines that the equipment temperature of the user equipment at the base station indication time is higher than the preset temperature threshold.

In an embodiment, the time determining module 620 includes:

a third detection sub-module 626, configured to detect the equipment temperature of the user equipment within the second preset time period, when the monitoring result is that the response message is monitored within the first preset time period and the radio link configuration indicates to reduce the response message, wherein starting time of the second preset time period is the time receiving the response message;

a third determining sub-module 627, configured to determine ending time of the second preset time period as the sending time when the third detecting sub-module 626 determines that the equipment temperature of the user equipment within the second preset time period indicates that the user equipment is still overheated; and a fourth determining sub-module 628, configured to determine time when the user equipment is overheated again as the sending time when the third detecting sub-module 626 determines that the equipment temperature of the user equipment within the second preset time period indicates that the user equipment is no longer overheated.

In an embodiment, the setting manner of the second preset time period is static setting or dynamic setting.

Figure 8:
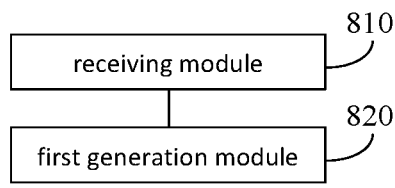
FIG. 8 is a block diagram showing a device for protecting a user equipment according to an exemplary embodiment.

FIG. 8 is a block diagram showing a device for protecting a user equipment according to an exemplary embodiment, wherein the device is applied to a base station. As shown in FIG. 8, the device for protecting a user equipment includes:

a receiving module 810, configured to receive a request message for adjusting a radio link configuration sent by a user equipment; and a first generation module 820, configured to generate and send a first response message when it is determined there is no need to adjust the radio link configuration based on the request message received by the receiving module 810, wherein a base station indication time is carried in the first response message, and the base station indication time is used to indicate the time when the base station indicates that the user equipment sends the request message again.

Figure 9:
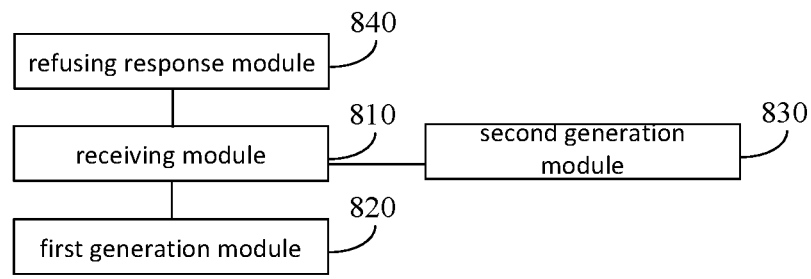
FIG. 9 is a block diagram showing another device for protecting a user equipment according to an exemplary embodiment.

FIG. 9 is a block diagram showing another device for protecting a user equipment according to an exemplary embodiment. As shown in FIG. 9, on the basis of the above embodiment shown in FIG. 8, in an embodiment, the device also includes:

a second generation module 830, configured to generate and send a second response message when it is determined that there is a need to adjust the radio link configuration based on the request message received by the receiving module 810, wherein the radio link configuration information which the user equipment is to be adjusted to is carried in the second response message.

In an embodiment, a time length of the second preset time period is further carried in the second response message.

In an embodiment, the device further includes:

a refusing response module 840, configured to refuse to send a response message to the user equipment when it is determined that there is no need to adjust the radio link configuration based on the request message received by the receiving module 810.

With regard to the device in the above embodiments, the specific manner in which the respective modules perform the operations has been described in detail in the embodiments relating to the method, and will not be explained in detail herein.

Figure 10:
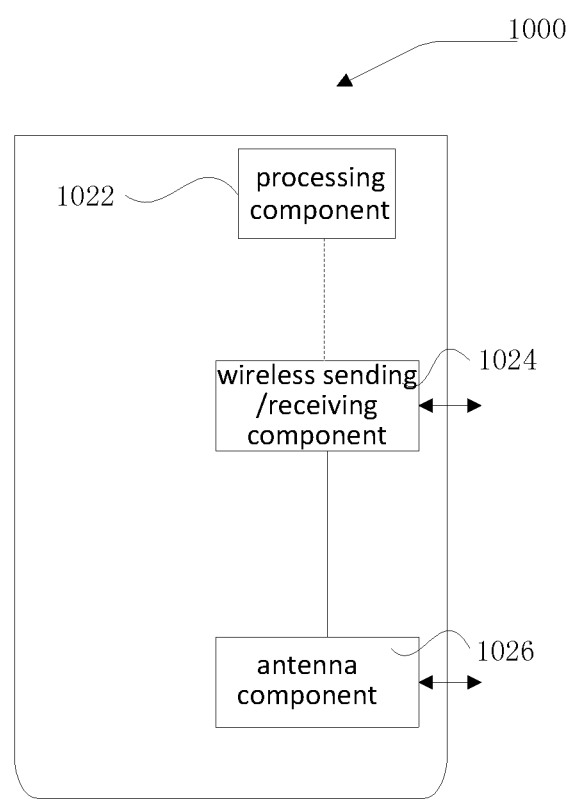
FIG. 10 is a block diagram showing a device suitable for protecting a user equipment according to an exemplary embodiment.

FIG. 10 is a block diagram showing a device suitable for protecting a user equipment according to an exemplary embodiment. The device 1000 can be provided as a base station. Referring to FIG. 10, the device 1000 includes a processing component 1022, a wireless sending/receiving component 1024, an antenna component 1026, and a signal processing portion specifically possessed by a wireless interface, and the processing component 1022 can further include one or more processors.

One of the processors in the processing component 1022 can be configured to perform the method for protecting the user device described above.

In an exemplary embodiment, a non-transitory computer readable storage medium including instructions is also provided. The above instructions can be executed by the processing component 1022 of the device 1000 to perform the above method. For example, the non-transitory computer readable storage medium can be a ROM, a random-access memory (RAM), a CD-ROM, a magnetic tape, a floppy disk, and an optical data storage device.

A non-transitory computer readable storage medium, when the instructions in the storage medium are executed by a processor of the base station, to enable the base station to perform the method for protecting the user equipment disclosed in the second aspect, including:

receiving a request message for adjusting a radio link configuration sent by the user equipment;

generating and sending a first response message when it is determined there is no need to adjust the radio link configuration based on the request message, wherein a base station indication time is carried in the first response message, and the base station indication time is used to indicate the time when the base station indicates that the user equipment sends the request message again.

Figure 11:
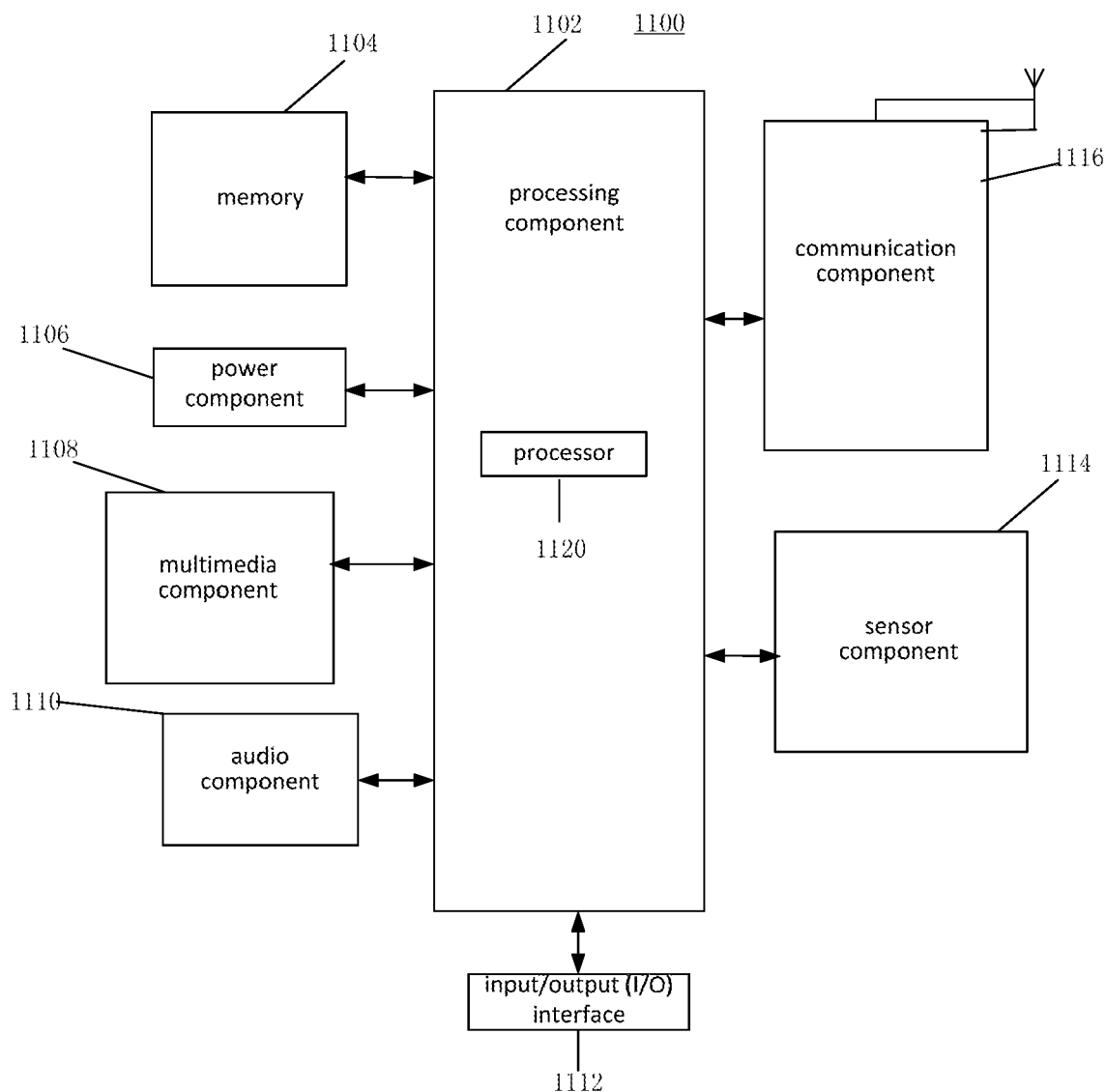
FIG. 11 is a block diagram showing a device suitable for protecting a user equipment according to an exemplary embodiment.

FIG. 11 is a block diagram showing a device suitable for protecting a user equipment according to an exemplary embodiment. For example, the device 1100 can be a first device, such as a smart phone.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls the overall operations of the device 1100, such as the operations associated with display, telephone calls, data communications, camera operations, and recording operations. The processing component 1102 can include one or more processors 1120 to execute instructions to perform all or part of the steps in the above described methods. Moreover, the processing component 1102 can include one or more modules to facilitate the interaction between the processing component 1102 and other components. For example, the processing component 1102 can include a multimedia module to facilitate the interaction between the multimedia component 1108 and the processing component 1102.

The memory 1104 is configured to store various types of data to support the operation of the device 1100. Examples of such data include instructions for any application or method operated on device 1100, such as the contact data, the phone book data, messages, pictures, videos, and the like. The memory 1104 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 can include a power management system, one or more power sources, and other components associated with the generation, management, and distribution of power in the device 1100.

The multimedia component 1108 includes a screen providing an output interface between the device 1100 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. When the device 1100 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1110 is configured to output and/or input an audio signal. For example, the audio component 1110 includes a microphone (MIC) configured to receive an external audio signal when the device 1100 is in an operation mode, such as a call mode, a recording mode, and a voice recognition mode. The received audio signal may be further stored in the memory 1104 or sent via the communication component 1116. In some embodiments, the audio component 1110 also includes a speaker for outputting the audio signal.

The I/O interface 1112 provides an interface between the processing component 1102 and peripheral interface modules, such as a keyboard, a click wheel, buttons, and the like. These buttons may include, but are not limited to, a home button, a volume button, a starting button, and a locking button.

The sensor component 1114 includes one or more sensors for providing status assessments of various aspects of the device 1100. For example, the sensor component 1114 can detect an open/closed status of the device 1100, relative positioning of components, for example the components may be the display and the keypad of the device 1100. The sensor component 1114 can also detect a change in position of one component of the device 1100 or the device 1100, the presence or absence of user contact with the device 1100, an orientation or an acceleration/deceleration of the device 1100, and a change in temperature of the device 1100. The sensor component 1114 can include a proximity sensor configured to detect the presence of nearby objects without any physical contact. The sensor component 1114 can also include a light sensor, such as a CMOS or CCD image sensor, configured to be used in imaging applications. In some embodiments, the sensor component 1114 can also include an accelerometer sensor, a gyroscope sensor, a magnetic sensor, a pressure sensor, or a temperature sensor.

The communication component 1116 is configured to facilitate wired or wireless communication between the device 1100 and other devices. The device 1100 can access a wireless network based on a communication standard, such as WiFi, 2G or 3G, or a combination thereof. In an exemplary embodiment, the communication component 1116 receives broadcast signals or broadcast associated information from an external broadcast management system via a broadcast channel. In an exemplary embodiment, the communication component 1116 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 1100 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium including instructions, such as a memory 1104 including instructions executable by the processor 1120 of the device 1100 to perform the above described method. For example, the non-transitory computer readable storage medium may be a ROM, a random-access memory (RAM), a CD-ROM, a magnetic tape, a floppy disc, and an optical data storage device.

A non-transitory computer readable storage medium, when the instructions in the storage medium are executed by a processor of the base station, to enable the base station to perform the method for protecting the user equipment disclosed in the first aspect, including:

after sending a first request message for adjusting radio link configuration to a base station, monitoring a response message corresponding to the first request message in a first preset time period;

determining a sending time for sending a second request message for adjusting the radio link configuration based on a monitoring result during the first preset time period; and sending the second request message at the sending time.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

The invention claimed is:

1. A method for protecting a user equipment, comprising:
responsive to determining that overheating of the user equipment is caused by a radio link configuration being higher than a predetermined level, determining whether to send a first request message for adjusting the radio link configuration to a base station based on a user preference, wherein the overheating is determined based on an equipment temperature of the user equipment to be higher than a preset temperature threshold;
responsive to determining to send the first request message for adjusting the radio link configuration to the base station based on the user preference, sending the first request message for adjusting the radio link configuration to the base station;
after sending the first request message for adjusting the radio link configuration to a base station, monitoring a response message, from the base station, corresponding to the first request message during a first preset time period;
determining a sending time for sending a second request message for adjusting the radio link configuration based on a monitoring result regarding the response message during the first preset time period; and sending the second request message at the sending time.

2. The method according to claim 1, wherein a setting manner of the first preset time period is static setting, or semi-static setting, or dynamic setting.

3. The method according to claim 1, wherein the determining the sending time for sending the second request message for adjusting the radio link configuration based on a monitoring result during the first preset time period comprises:
responsive to determining that the monitoring result is that the response message is not detected during the first preset time period, detecting the equipment temperature of the user equipment at an ending time of the first preset time period; and
responsive to determining that the equipment temperature of the user equipment is higher than a preset temperature threshold at the ending time of the first preset time period, determining the ending time of the first preset time period as the sending time.

4. The method according to claim 1, wherein the determining the sending time for sending the second request message for adjusting the radio link configuration based on a monitoring result during the first preset time period comprises:
responsive to determining that the monitoring result is that the response message is monitored during the first preset time period, parsing the response message to obtain a base station indication time;
detecting the equipment temperature of the user equipment at the base station indication time; and
responsive to determining that the equipment temperature of the user equipment at the base station indication time is higher than the preset temperature threshold, determining the base station indication time as the sending time.

5. The method according to claim 1, wherein the determining the sending time for sending the second request message for adjusting the radio link configuration based on a monitoring result during the first preset time period comprises:
responsive to determining that the monitoring result is that the response message is monitored during the first preset time period and the response message indicates to reduce the radio link configuration, detecting the equipment temperature of the user equipment during the second preset time period, wherein a starting time of the second preset time period is a time the response message is received;
responsive to determining that the equipment temperature of the user equipment during the second preset time period indicates that the user equipment is still overheated, determining an ending time of the second preset time period as the sending time; and
responsive to determining that the equipment temperature of the user equipment during the second preset time period indicates that the user equipment is no longer overheated, determining a time when the user equipment is overheated again as the sending time.

6. The method according to claim 5, wherein a setting manner of the second preset time period is static setting or dynamic setting.

7. A method for protecting a user equipment, comprising:
responsive to determining that overheating of the user equipment is caused by a radio link configuration being higher than a predetermined level, determining whether to send a first request message for adjusting the radio link configuration to a base station based on a user preference, wherein the overheating is determined based on an equipment temperature of the user equipment to be higher than a preset temperature threshold;
responsive to determining to send the first request message for adjusting the radio link configuration to the base station based on the user preference, sending the first request message for adjusting the radio link configuration to the base station;
receiving, by the base station, the first request message for adjusting a radio link configuration sent by the user equipment; and
generating and sending a first response message responsive to determining that there is no need to adjust the radio link configuration based on the request message, wherein a base station indication time is carried in the first response message, and the base station indication time is used by the base station to indicate a time at which the user equipment should send a second request message for adjusting the radio link configuration.

8. The method according to claim 7, further comprising:
generating and sending a second response message responsive to determining that there is a need to adjust the radio link configuration based on the second request message, wherein a different radio link configuration which the user equipment is to be adjusted to is carried in the second response message.

9. The method according to claim 8, wherein a time length of a second preset time period is further carried in the second response message.

10. The method according to claim 7, further comprising:
refusing to send the first response message to the user equipment responsive to determining that there is no need to adjust the radio link configuration based on the first request message.

11. A user equipment, comprising:
a processor; and
a memory storing instructions executable by the processor;
wherein the processor is configured to execute the instructions to perform operations including:
responsive to determining that overheating of the user equipment is caused by a radio link configuration being higher than a predetermined level, determining whether to send a first request message for adjusting the radio link configuration to a base station based on a user preference, wherein the overheating is determined based on an equipment temperature of the user equipment to be higher than a preset temperature threshold;
responsive to determining to send the first request message for adjusting the radio link configuration to the base station based on the user preference, sending the first request message for adjusting the radio link configuration to the base station;
after sending the first request message for adjusting the radio link configuration to the base station, monitoring a response message, from the base station, corresponding to the first request message during a first preset time period;

determining a sending time for sending a second request message for adjusting the radio link configuration based on a monitoring result regarding the response message during the first preset time period; and sending the second request message at the sending time.

12. The user equipment according to claim 11, wherein the determining the sending time for sending the second request message for adjusting the radio link configuration based on a monitoring result during the first preset time period comprises:

responsive to determining that the monitoring result is that the response message is not detected during the first preset time period, detecting the equipment temperature of the user equipment at an ending time of the first preset time period; and responsive to determining that the equipment temperature of the user equipment is higher than a preset temperature threshold at the ending time of the first preset time period, determining the ending time of the first preset time period as the sending time.

13. The user equipment according to claim 11, wherein the determining the sending time for sending the second request message for adjusting the radio link configuration based on a monitoring result during the first preset time period comprises:

responsive to determining that the monitoring result is that the response message is monitored during the first preset time period, parsing the response message to obtain a base station indication time; detecting the equipment temperature of the user equipment at the base station indication time; and responsive to determining that the equipment temperature of the user equipment at the base station indication time is higher than the preset temperature threshold, determining the base station indication time as the sending time.

14. The user equipment according to claim 11, wherein the determining the sending time for sending the second request message for adjusting the radio link configuration based on a monitoring result during the first preset time period comprises:

responsive to determining that the monitoring result is that the response message is monitored during the first preset time period and the response message indicates to reduce the radio link configuration, detecting the equipment temperature of the user equipment during the second preset time period, wherein a starting time of the second preset time period is a time the response message is received;

responsive to determining that the equipment temperature of the user equipment during the second preset time period indicates that the user equipment is still overheated, determining an ending time of the second preset time period as the sending time; and responsive to determining that the equipment temperature of the user equipment during the second preset time period indicates that the user equipment is no longer overheated, determining a time when the user equipment is overheated again as the sending time.

15. A base station, comprising:

a processor; and a memory storing instructions executable by the processor;

wherein the processor is configured to execute the instructions to perform operations including:

receiving, by the base station, a first request message for adjusting a radio link configuration sent by a user equipment based on a user preference, responsive to determining, by the user equipment, that overheating of the user equipment is caused by a radio link configuration being higher than a predetermined level, wherein the overheating is determined based on an equipment temperature of the user equipment to be higher than a preset temperature threshold; and generating and sending a first response message responsive to determining that there is no need to adjust the radio link configuration based on the first request message, wherein a base station indication time is carried in the first response message, and the base station indication time is used by the base station to indicate a time at which the user equipment should send a second request message for adjusting the radio link configuration.

16. The base station according to claim 15, wherein the operations further comprise:

generating and sending a second response message responsive to determining that there is a need to adjust the radio link configuration based on the second request message, wherein a different radio link configuration which the user equipment is to be adjusted to is carried in the second response message.

17. The base station according to claim 16, wherein a time length of a second preset time period is further carried in the second response message.

18. The base station according to claim 15, wherein the operations further comprise:

refusing to send the first response message to the user equipment responsive to determining that there is no need to adjust the radio link configuration based on the request message.

* * * * *